(12) United States Patent
Bruns et al.

(10) Patent No.: US 7,770,792 B2
(45) Date of Patent: Aug. 10, 2010

(54) METHODS AND SYSTEMS FOR MANAGING STOCK TRANSPORTATION

(75) Inventors: Arno D. Bruns, Karlsruhe (DE); Stefan Grabowski, Osthofen (DE); Daniela Schalper, Mühlhausen (DE)

(73) Assignee: SAP AG, Walldorf (DE)

( * ) Notice: Subject to any disclaimer, the term of this patent is extended or adjusted under 35 U.S.C. 154(b) by 566 days.

(21) Appl. No.: 10/873,221

(22) Filed: Jun. 23, 2004

(65) Prior Publication Data

US 2005/0289020 A1    Dec. 29, 2005

(51) Int. Cl.
| G06F 19/00 | (2006.01) |
| G06F 7/00 | (2006.01) |
| G06F 7/04 | (2006.01) |
| G06Q 30/00 | (2006.01) |
| G06Q 90/00 | (2006.01) |
| G06Q 10/00 | (2006.01) |
| G06K 15/00 | (2006.01) |
| G07B 15/02 | (2006.01) |
| G05B 19/00 | (2006.01) |
| G05B 23/00 | (2006.01) |

(52) U.S. Cl. .................. 235/385; 235/384; 235/383; 340/5.92; 705/28

(58) Field of Classification Search ......... 235/383–385, 235/435, 487; 705/28; 340/5.92
See application file for complete search history.

(56) References Cited

U.S. PATENT DOCUMENTS

| 3,958,102 | A | 5/1976 | Burt |
| 5,201,397 | A | 4/1993 | Isaacs |
| 5,725,253 | A | 3/1998 | Salive et al. |
| 5,780,826 | A | 7/1998 | Hareyama et al. |
| 5,804,810 | A | 9/1998 | Woolley et al. |
| 5,886,634 | A | * | 3/1999 | Muhme .................. 340/572.1 |
| 5,890,562 | A | 4/1999 | Bartels et al. |
| 5,959,568 | A | 9/1999 | Woolley |
| 6,202,925 | B1 | 3/2001 | Machii et al. |
| 6,496,806 | B1 | * | 12/2002 | Horwitz et al. .............. 705/28 |
| 6,600,418 | B2 | 7/2003 | Francis et al. |
| 6,662,068 | B1 | * | 12/2003 | Ghaffari .................... 700/115 |
| 6,669,089 | B2 | 12/2003 | Cybulski et al. |
| 6,748,292 | B2 | * | 6/2004 | Mountz .................... 700/214 |
| 6,768,931 | B2 | 7/2004 | Takehara et al. |
| 6,801,245 | B2 | 10/2004 | Shniberg et al. |

(Continued)

OTHER PUBLICATIONS

U.S. Appl. No. 10/873,272, filed Jun. 23, 2004, entitled "Methods and Systems for Managing Stock."

Primary Examiner—Daniel Walsh
(74) Attorney, Agent, or Firm—Finnegan, Henderson, Farabow, Garrett & Dunner, LLP

(57) ABSTRACT

Systems and methods are disclosed for providing stock visibility during transportation of stock from between storage facilities. Such systems and methods can provide information identifying the location of stock while it is being transported to a new location and can provide the ability to alter the destination of stock while it is in transit to a new location. Upon the removal of stock from a warehouse, an inventory management system may be updated to indicate a transport unit of a vehicle that is being used to move the stock and, thus, provide visibility of the stock while it is in transit. In addition, through identification of the transport unit moving the stock to a new location, the vehicle transporting the stock may be rerouted to transfer the stock to an alternate location.

22 Claims, 15 Drawing Sheets

U.S. PATENT DOCUMENTS

| | | | |
|---|---|---|---|
| 6,996,673 B2 * | 2/2006 | Goodman et al. | 711/114 |
| 7,036,729 B2 | 5/2006 | Chung | |
| 7,038,573 B2 | 5/2006 | Bann | |
| 7,121,457 B2 | 10/2006 | Michal, III | |
| 7,148,800 B2 * | 12/2006 | Cunningham et al. | 340/539.11 |
| 7,180,423 B2 | 2/2007 | Forster et al. | |
| 7,236,851 B2 | 6/2007 | Charych | |
| 7,267,270 B2 * | 9/2007 | Hopwood et al. | 235/384 |
| 7,273,172 B2 * | 9/2007 | Olsen et al. | 235/385 |
| 7,295,114 B1 | 11/2007 | Drzaic et al. | |
| 7,319,393 B2 | 1/2008 | Forster | |
| 7,336,152 B2 | 2/2008 | Horwitz et al. | |
| 7,394,358 B2 | 7/2008 | Cherry | |
| 7,557,714 B2 * | 7/2009 | Roeder et al. | 340/572.7 |
| 7,657,467 B2 * | 2/2010 | Deganis et al. | 705/28 |
| 7,664,674 B2 * | 2/2010 | Negron | 705/26 |
| 7,669,763 B2 * | 3/2010 | Ernesti et al. | 235/385 |
| 7,689,478 B2 * | 3/2010 | Godlewski | 705/28 |
| 7,698,175 B2 * | 4/2010 | Franz et al. | 705/28 |
| 7,719,423 B2 * | 5/2010 | Himberger et al. | 340/572.1 |
| 7,720,724 B2 * | 5/2010 | Kurashige | 705/28 |
| 2001/0030232 A1 * | 10/2001 | Piatek | 235/375 |
| 2002/0070862 A1 * | 6/2002 | Francis et al. | 340/572.1 |
| 2002/0130778 A1 * | 9/2002 | Nicholson | 340/572.1 |
| 2002/0134836 A1 | 9/2002 | Cash et al. | |
| 2002/0138352 A1 * | 9/2002 | DeMaggio | 705/22 |
| 2003/0083964 A1 * | 5/2003 | Horwitz et al. | 705/28 |
| 2003/0117268 A1 * | 6/2003 | Hewitt et al. | 340/5.92 |
| 2003/0141985 A1 * | 7/2003 | Haller et al. | 340/825.49 |
| 2003/0149644 A1 | 8/2003 | Stingel et al. | |
| 2003/0150909 A1 * | 8/2003 | Markham et al. | 235/376 |
| 2003/0158796 A1 | 8/2003 | Balent | |
| 2003/0201321 A1 | 10/2003 | Maloney | |
| 2003/0233165 A1 * | 12/2003 | Hein et al. | 700/216 |
| 2004/0102869 A1 | 5/2004 | Andersen et al. | |
| 2004/0139806 A1 | 7/2004 | Christmas | |
| 2004/0143505 A1 | 7/2004 | Kovach | |
| 2004/0181310 A1 | 9/2004 | Stashluk et al. | |
| 2004/0182650 A1 | 9/2004 | Harris et al. | |
| 2004/0199285 A1 * | 10/2004 | Berichon et al. | 700/225 |
| 2004/0206810 A1 | 10/2004 | Yamagiwa | |
| 2004/0232691 A1 * | 11/2004 | Lazzerini | 283/67 |
| 2005/0035860 A1 | 2/2005 | Taylor et al. | |
| 2005/0052281 A1 | 3/2005 | Bann | |
| 2005/0065861 A1 | 3/2005 | Bann | |
| 2005/0071234 A1 * | 3/2005 | Schon | 705/22 |
| 2005/0237843 A1 | 10/2005 | Hyde | |
| 2005/0242169 A1 | 11/2005 | Michal | |
| 2005/0256775 A1 * | 11/2005 | Schapler et al. | 705/22 |
| 2005/0284934 A1 * | 12/2005 | Ernesti et al. | 235/385 |
| 2005/0289020 A1 * | 12/2005 | Bruns et al. | 705/28 |
| 2006/0011721 A1 * | 1/2006 | Olsen et al. | 235/385 |
| 2006/0020529 A1 * | 1/2006 | Chao et al. | 705/35 |
| 2006/0049249 A1 * | 3/2006 | Sullivan | 235/385 |
| 2006/0071072 A1 * | 4/2006 | McDonald | 235/385 |
| 2006/0150851 A1 * | 7/2006 | Bremond et al. | 101/484 |
| 2006/0170565 A1 | 8/2006 | Husak et al. | |
| 2006/0187041 A1 * | 8/2006 | Olsen et al. | 340/572.1 |
| 2006/0192003 A1 | 8/2006 | Chung | |
| 2006/0208893 A1 * | 9/2006 | Anson et al. | 340/572.1 |
| 2006/0232412 A1 | 10/2006 | Tabacman et al. | |
| 2006/0255948 A1 | 11/2006 | Runyon et al. | |
| 2006/0255949 A1 * | 11/2006 | Roeder et al. | 340/572.7 |
| 2006/0255951 A1 | 11/2006 | Roeder et al. | |
| 2006/0287759 A1 * | 12/2006 | Charych | 700/213 |
| 2007/0000990 A1 | 1/2007 | Baldassari et al. | |
| 2007/0001809 A1 | 1/2007 | Kodukula et al. | |
| 2007/0005459 A1 | 1/2007 | Fowler | |
| 2007/0013480 A1 * | 1/2007 | Kantrowitz et al. | 340/5.92 |
| 2007/0040682 A1 | 2/2007 | Zhu et al. | |
| 2007/0069017 A1 | 3/2007 | Magens et al. | |
| 2007/0096919 A1 | 5/2007 | Knadle et al. | |
| 2007/0135961 A1 | 6/2007 | Ishida et al. | |
| 2007/0156281 A1 * | 7/2007 | Leung et al. | 700/225 |
| 2007/0156536 A1 | 7/2007 | Alfandary et al. | |
| 2007/0164863 A1 | 7/2007 | Himberger et al. | |
| 2007/0187496 A1 | 8/2007 | Andersen et al. | |
| 2007/0210923 A1 | 9/2007 | Butler et al. | |
| 2007/0215700 A1 | 9/2007 | Reznik et al. | |
| 2007/0219916 A1 * | 9/2007 | Lucas | 705/58 |
| 2007/0282482 A1 * | 12/2007 | Beucher et al. | 700/225 |
| 2007/0296585 A1 | 12/2007 | Ishida et al. | |
| 2008/0001748 A1 | 1/2008 | Childress et al. | |
| 2008/0024274 A1 | 1/2008 | Ishida et al. | |
| 2008/0068170 A1 | 3/2008 | Ehrman et al. | |
| 2008/0100445 A1 | 5/2008 | Horwitz et al. | |
| 2008/0195517 A1 * | 8/2008 | Minerley | 705/35 |
| 2008/0198016 A1 * | 8/2008 | Lawrence et al. | 340/572.4 |
| 2008/0210756 A1 * | 9/2008 | Minerley | 235/385 |
| 2008/0319843 A1 | 12/2008 | Moser et al. | |
| 2010/0026495 A1 * | 2/2010 | Fast et al. | 340/572.1 |
| 2010/0038422 A1 * | 2/2010 | Cardullo | 235/385 |
| 2010/0039262 A1 * | 2/2010 | Cameron | 340/568.1 |
| 2010/0042496 A1 * | 2/2010 | Wang et al. | 705/14.49 |
| 2010/0096453 A1 * | 4/2010 | Dyer et al. | 235/383 |
| 2010/0106515 A1 * | 4/2010 | Mccoy | 705/2 |
| 2010/0109844 A1 * | 5/2010 | Carrick et al. | 340/10.1 |

* cited by examiner

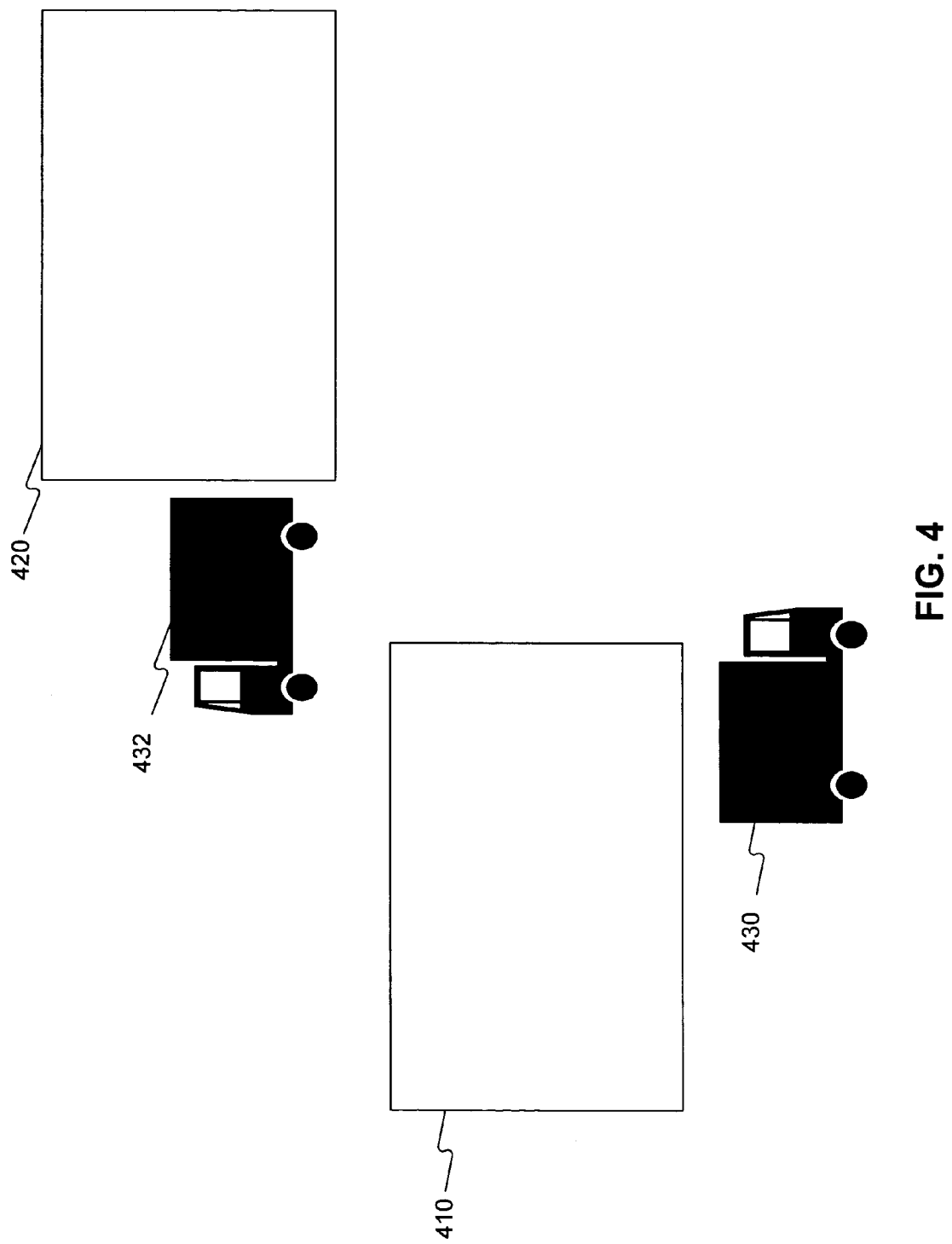

605

Resource Table

| GUID | Resource Type | User Name | Status |
|------|---------------|-----------|----------|
| R1 | forklift | W1 | active |
| R2 | trolley | W2 | inactive |
| R3 | human | W3 | active |

FIG. 6

Stock Index Table

| GUID | Material Number | Batch | Category | Owner |
|---|---|---|---|---|
| S1 | Mat 1 | B1 | blocked | O1 |
| S2 | Mat 1 | B2 | received | O2 |
| S3 | Mat 2 | B2 | received | O2 |

| HU Index Table | | |
|---|---|---|
| GUID | HU Identifier | |
| H1 | 4711 | |
| H2 | 4712 | |
| H3 | 4713 | |

Location Index Table

| GUID | Warehouse Number | Storage Type | Location Number |
|---|---|---|---|
| L1 | 001 | 010 | 120 |
| L2 | 001 | 010 | 130 |
| L3 | 001 | 005 | 140 |

Location and Heirarchy Table (1105)

| ID | Index | Type | Parent | Parent Index | Parent Type | Level | Node |
|----|-------|------|--------|--------------|-------------|-------|------|
| S1 | 002 | S | H1 | 001 | H | 1 | X4 |
| S1 | 002 | S | L2 | 001 | L | 2 | X4 |
| S1 | 002 | S | Root |  |  | 3 | X4 |
| S2 | 002 | S | H1 | 001 | H | 1 | X3 |
| S2 | 002 | S | L2 | 001 | L | 2 | X3 |
| S2 | 003 | S | Root |  |  | 3 | X3 |
| H1 | 001 | H | L2 | 001 | L | 1 | X2 |
| H1 | 001 | H | Root |  |  | 2 | X2 |
| L1 | 001 | L | Root |  |  | 1 | X1 |

| Transport Unit | | | |
|---|---|---|---|
| GUID | Transport Unit Number | Client | Location |
| TU1 | 1301 | C1 | V1 |
| TU2 | 1302 | C2 | V2 |
| TU3 | 1303 | C3 | V2 |

Assignment Table

| Client | Transport Unit Number | Start Time Stamp | End Time Stamp | Vehicle Number |
|---|---|---|---|---|
| C1 | 1301 | T1 | T2 | V1 |
| C2 | 1302 | T3 | T4 | V2 |
| C3 | 1303 | T5 | T6 | V2 |

METHODS AND SYSTEMS FOR MANAGING STOCK TRANSPORTATION

BACKGROUND OF THE INVENTION

I. Field of the Invention

The present invention generally relates to methods and systems for managing the transportation of stock, including the management of the movement of stock to and from a warehouse yard or from one warehouse or storage facility to another. More particularly, the invention relates to methods and systems for managing stock transportation and providing visibility of the location of stock, including during the placement of the stock in a warehouse yard or during its transport from one location to another.

II. Background Information

A typical warehouse includes storage areas for storing stock. Such storage areas may include rows of shelves that accommodate a large number of storage bins. The storage bins on each shelf are usually labeled, as are the rows, for ease of identification. By knowing the relevant row and bin information, it is possible for warehouse workers to locate stock in the warehouse. In such cases, the row and bin of the desired stock is used like an address to locate the stock.

During normal warehouse operations, there can be many requests for different stock items each day. In addition, stock is often moved from one location in the warehouse to another for a variety of reasons. For example, it may be necessary to move stock from one bin location to another to better organize the stock, to locate certain stock in an area for inspection, and/or to prepare the stock for shipment outside of the warehouse.

Typically, requests to move stock are issued as transfer orders. When a warehouse worker is given a transfer order, the worker must first locate the desired stock. A transfer order to transfer stock to a new location usually includes the stock's storage location, which is based on row and bin information retrieved from, for example, a computerized inventory system. Such a system maintains location information describing where stock is located in the warehouse.

After receiving the transfer order, a warehouse worker will determine the location of the stock and travel to that location using the stock's row and bin information. The particular stock requested in the transfer order is then identified. Once the worker has located the stock, the worker may need to use a resource, such as a forklift, to transport the stock to its new location. Upon moving the stock from its current location, the worker may use a scanner to scan a bar code or radio frequency identification (RFID) on the bin to confirm the pickup of the piece(s) of stock. Typically, the worker will use a scanner to scan a bar code or RFID located on the stock itself and a bar code or RFID located on the bin when picking up the stock. Once the worker has scanned these items, the information is transmitted and a database in the computerized inventory system is updated to indicate that the particular stock is no longer located in the bin.

Once the stock arrives at its new location, the worker may use the scanner to update the stock's location in the warehouse. For example, the worker may accomplish this by scanning the bar code or RFID located on the stock and scanning the bar code or RFID associated with the stock's new bin location. As a consequence, the stock inventory database is updated to indicate that the moved stock is now located in its new bin location in the warehouse.

In addition, stock is often moved to or from a warehouse yard or from one warehouse or storage facility to another. For example, where the storage capacity of a warehouse is a limiting factor, the warehouse yard may be used to provide additional storage capacity. In such cases, a warehouse manager may wish to post stock as received as soon as a vehicle transporting the stock is checked into the yard. Similarly, it may be desirable to post stock when a check-out is made of the transport vehicle from the yard.

In order to track and manage stock in the yard, a warehouse manager needs shipping and receiving visibility. To accomplish this, the warehouse manager may utilize different inventory management systems (e.g., a warehouse internal system and a yard specific system). However, the use of such systems can be time consuming and lead to errors. Furthermore, stock management can become more difficult in cases where the yard is shared by more than one warehouse or where transport vehicles in the yard contain stock from different warehouses.

Shipping and receiving visibility is also required when stock is moved between warehouses or storage facilities. To move stock from a warehouse, the stock is typically loaded onto a transport vehicle such as a truck and transported to the new location. With current inventory management systems, there is little or no ability to determine where stock is located once it has left the warehouse. During transportation, it is also not possible to determine what truck the stock may be on at any given time. For example, a truck may stop at several warehouses on a route and, at each warehouse, the truck may unload certain stock, pick up additional stock, and/or continue to another warehouse.

Existing inventory management systems also suffer from other drawbacks. For example, due to the rapid and fluid environment of modern warehouses and transportation services, workers often receive instructions to change the destination of stock that has already been picked-up and is in the process of being transferred to another location. However, once the stock has been picked-up from its original location, it is not possible to determine the stock's location until it arrives at its final destination. As a result, it is often necessary to wait until the stock arrives at a warehouse and/or until an inventory database is updated before the stock can be identified and located. In a busy delivery or supply chain environment, this can result in substantial delays and inefficiencies due to the inability to rapidly locate stock and respond to urgent stock needs or change transfer orders.

In view of the foregoing, there is a need for improved systems and methods for managing stock, including the ability to monitor and alter the destination of stock while it is in transit. Moreover, there is a need for methods and systems for providing visibility of the location of stock, including during its placement in a warehouse yard or during its transport between warehouses or storage facilities.

SUMMARY OF THE INVENTION

Consistent with embodiments of the present invention, methods and systems are disclosed for providing stock visibility, including providing information identifying the location of stock while it is located outside of the warehouse (e.g., on the yard) or being transported to a new location. Systems and methods are also provided, consistent with the invention, for altering the destination of stock while it is in transit to a new location.

In accordance with one embodiment, a method is provided for managing stock. The method may comprise: providing a stock identifier to identify the stock; providing a transport unit identifier to identify a transport unit of a vehicle; and associating the stock identifier with the transport unit identifier when the stock is being transported by the vehicle.

In accordance with another embodiment, a method is provided for managing stock using a database. The method may comprise: issuing a transfer order to move stock from a warehouse, the stock being identified in the database with a stock identifier; prior to execution of the transfer order, associating the stock identifier with a first location identifier in the database to identify the stock as being stored in a first location; and updating the database, during execution of the transfer order, to associate the stock identifier with a transport unit identifier for a transport unit of a vehicle, the vehicle transporting the stock to a second location in accordance with the transfer order.

In accordance with another embodiment, a system for managing stock is provided. The system may comprise: a plurality of records identifying stock; a record identifying at least one vehicle; and a management module for associating a stock identifier for stock with a corresponding one of the plurality of records identifying a warehouse location where the stock is stored and, when the stock is removed from the warehouse location and transported with a vehicle, associating the stock identifier with a transport unit identifier for a transport unit of the vehicle to thereby provide visibility of the stock during its transport.

In yet another embodiment, a system is provided for managing transportation of stock from a first storage facility to a second storage facility. The system may comprise: means for providing a stock identifier to identify stock stored in the first storage facility; means for providing a transport unit identifier to identify a transport unit of a vehicle for transporting the stock; means for associating the stock identifier with the transport unit identifier when the stock is transported by the vehicle; and means for associating the stock identifier with a location identifier for the second storage facility when the stock is transferred to the second storage facility.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings:

FIG. 4 is a diagram of an exemplary shipping environment, consistent with an embodiment of the present invention;

FIG. 6 is an exemplary resource table used to define resources, consistent with an embodiment of the present invention;

FIG. 8 is an exemplary stock index table, consistent with an embodiment of the present invention;

FIG. 9 illustrates an exemplary handling unit (HU) index table, consistent with an embodiment of the present invention;

FIG. 10 illustrates an exemplary location index table, consistent with an embodiment of the present invention;

FIG. 11 illustrates an exemplary location and hierarchy table, consistent with an embodiment of the present invention;

FIG. 13 illustrates an exemplary transport unit table, consistent with an embodiment of the present invention;

FIG. 15 illustrates an exemplary assignment table, consistent with an embodiment of the present invention.

DETAILED DESCRIPTION

Figure 1:
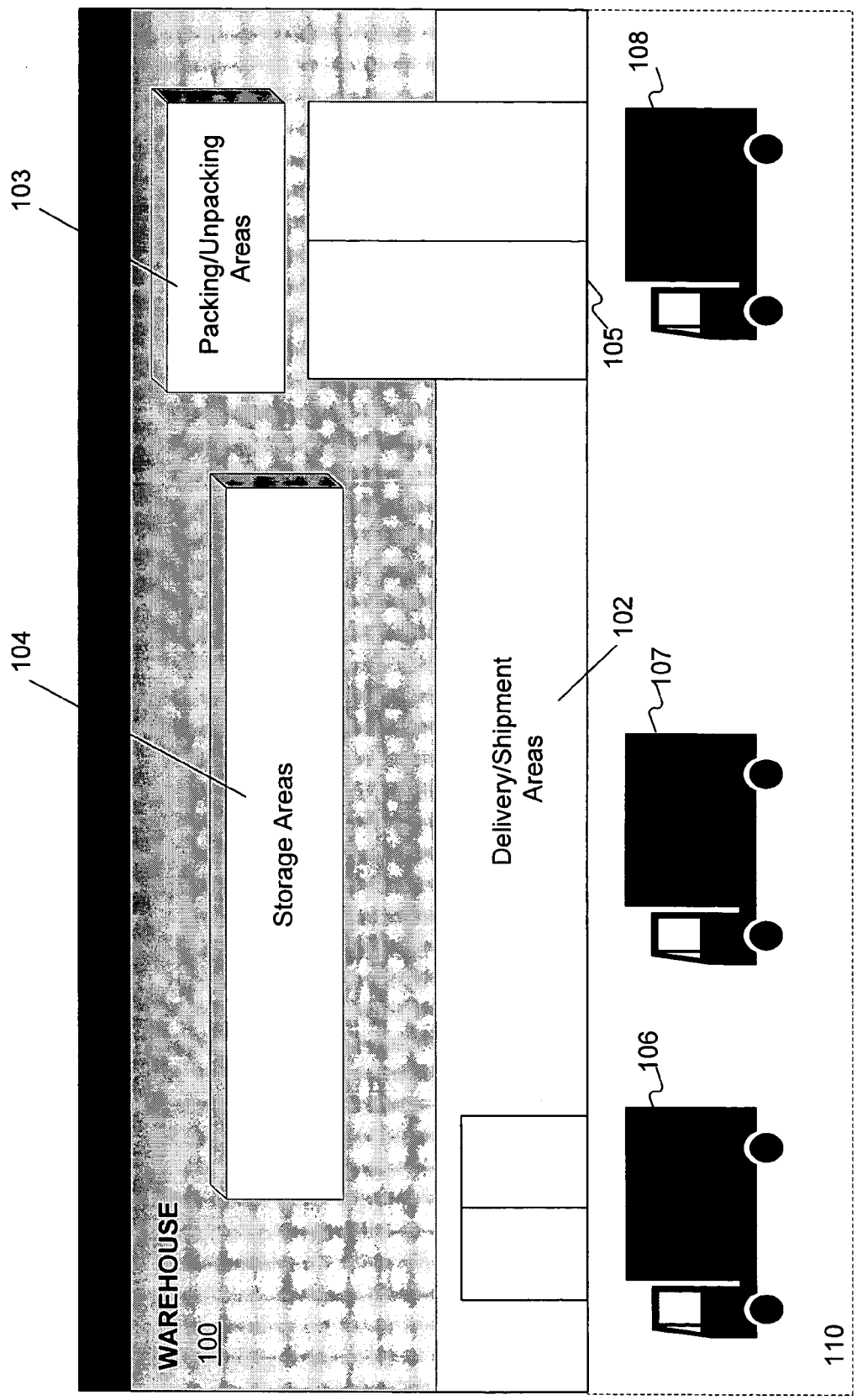
FIG. 1 is a diagram of an exemplary warehouse environment in which systems and methods for managing stock may be implemented, consistent with the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with embodiments of the present invention facilitate the management of stock transportation. By way of example, embodiments of the invention may be used for receiving, unloading, loading, shipping, yard management, and/or transport vehicle check-in and check-out. As further disclosed herein, embodiments of the invention provide stock visibility during transportation, including providing information to identify the location of stock while it is located outside of the warehouse (e.g., when it is located in a warehouse yard) or being transported to a new location, storage facility, or warehouse. In one embodiment, transport unit identifier(s) are defined which represent a unit or capacity of a transport vehicle (such as a van, truck, train, airplane, etc.) for transporting stock. Stock identifier(s) or handling unit (s) may be assigned to such transport identifier(s) to provide stock visibility when the stock is being transported or located outside of the warehouse. Systems and methods are also provided, consistent with embodiments of the invention, for altering the destination of stock while it is in transit to a new location, storage facility or warehouse.

As used herein, the term "stock" refers to any element or quantity of stock in a warehouse, other facility, or on a vehicle. By way of example, stock may comprise any quantity or number of parts for manufacturing or providing a finished product, or any quantity or number of parts that are used for providing services. Stock elements may also comprise commercial products or items, such as books, office supplies, articles of clothing, electronic devices, home appliances or other merchandise. By way of further example, in the context of a warehouse environment for an automotive or machinery supplier, stock may comprise automotive parts, engine parts, heavy equipment parts and the like.

For purposes of illustration, FIG. 1 illustrates an exemplary warehouse environment, in which systems and methods consistent with the present invention may be implemented.

In FIG. 1, a warehouse 100 is shown that serves as a facility for handling and storing stock. In one embodiment, warehouse 100 may function as the main warehouse facility of a supplier or merchant of goods or services. In other embodiments, warehouse 100 may be one of several warehouse facilities that are regionally located and/or part of a distribution or supply chain network. Additionally, or alternatively, warehouse 100 may be co-located with a store-front or other location for selling or otherwise providing goods or services to customers, such as warehouse stores, dealerships and other types of customer locations. Thus, warehouse 100 does not need to be a separately or remotely located storage facility.

Warehouse 100 may include a number of areas. For example, warehouse 100 may include one or more delivery and/or shipment areas 102 for receiving and shipping stock. Delivery/shipment areas 102 may include dock areas where one or more shipping vehicles 106-108 (e.g., shipping trucks, vans and the like) are received. As is customary, these dock areas may be used for the unloading or loading of pallets or handling units of stock, which may move into and out of warehouse 100 through doors 105. A warehouse yard 110 may also be provided outside of the warehouse for parking vehicles 106-108. The parking of vehicles 106-108 may be required between or during the transportation of stock. In some cases, warehouse yard 110 may be used to provide, for example, extra storage capacity for warehouse 100 for stock that will be received by or shipped from the warehouse.

As further shown in FIG. 1, warehouse 100 may also include other areas, such as one or more packing and/or unpacking areas 103. Packing/unpacking areas 103 may include areas where warehouse workers pack or unpack stock from the handling units. Areas 103 can be used in combination with delivery/shipment areas 102 to facilitate deliveries and shipment of stock to and from warehouse 100. In addition, one or more storage areas 104 may be provided for storing stock in the warehouse. Storage areas 104 may include a large number of storage bins that are arranged, for example, in rows of shelves (not shown). Additionally, or alternatively, other types of storage elements (such as containers, buckets, barrels and the like) may be used in storage areas 104.

Conventional techniques may be used for organizing and storing stock in storage areas 104. For example, the bins or other storage elements in areas 104 may be labeled for ease of identification. Labeling may be achieved through the use of any type of indicia or label, such as bar code labels or RFIDs. In addition to labeling the bins or storage elements, each storage area (e.g., each row of shelf space, etc.) in areas 104 may be labeled or otherwise marked. Thus, by knowing the relevant row and bin information, it is possible for warehouse workers to locate stock in the warehouse.

To control the transport of stock from warehouse 100 to other locations, a computerized inventory management system may be used (not shown in FIG. 1). Such a system may maintain location information for all stock being transported to and from the warehouse so that its movement can be tracked. The system may also maintain and issue transfer orders to instruct warehouse workers on the required movements of stock from one warehouse to another, or from a warehouse to a delivery location.

Figure 2:
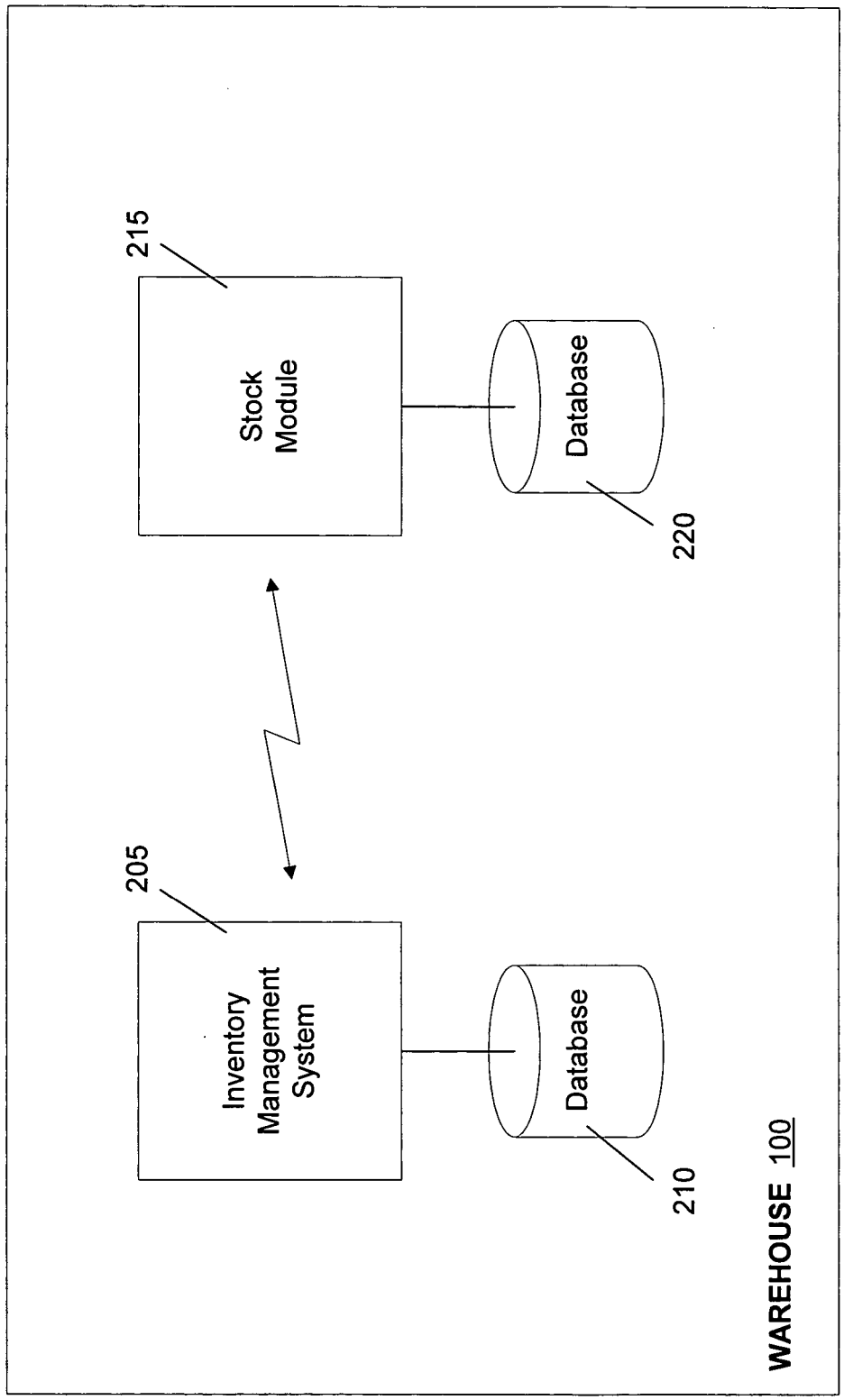
FIG. 2 is a diagram of an exemplary warehouse environment that includes an inventory management system, consistent with an embodiment of the present invention.

The computerized inventory system may include warehouse and/or transportation management modules that include software-enabled logic and one or more databases (see, e.g., FIG. 2). In one embodiment, the system is implemented with software-based, warehouse and transportation management modules that are part of a supply chain management (SCM) system or other operating environment. By way of example, the management modules may be implemented with warehouse management and transportation management components of an SCM system available from SAP AG (Walldorf, Germany).

Consistent with the present invention, warehouse 100 may be, but need not be, owned and operated by a supplier or merchant. One of ordinary skill in the art will recognize, however, that the relationship between warehouse 100 and a supplier or merchant may take many forms and is therefore not critical to the present invention. For instance, warehouse 100 may be owned or operated by a third party or entity on behalf of a supplier or merchant. These and other forms of ownership or operation may be provided so long as the stock management systems and methods are performed in accordance with the teachings hereof.

By way of further example, FIG. 2 illustrates an exemplary environment for a warehouse (such as warehouse 100 of FIG. 1). Consistent with the present invention, the exemplary embodiment of FIG. 2 includes an inventory management system 205. Similar to the computerized systems described above, inventory management system 205 may include one ore more modules, such as a warehouse management module and a transportation management module. In one embodiment, these modules may provide separate or distinct functionality, but share and act on a common set of data, such as location and stock-related data. The modules may be implemented with software-based logic for managing the day-to-day operations of the warehouse and the transportation of stock to and from the warehouse.

Inventory management system 205 may be implemented with a computing-based platform, such as a workstation, a computer, a laptop, a server, a network computer and the like. System 205 may also include a database 210 for storing data, consistent with the teachings of the present invention.

As further shown in FIG. 2, inventory management system 205 may interface or communicate with other components or modules. For example, if stock data for the warehouse is managed separately with a stock engine or module 215, an interface may be provided between system 205 and module 215. In such a case, stock module 215 may include and maintain its own database 220 with stock data. An interface between system 205 and module 215 may be provided that includes an index table to provide keys for mapping stock data held under module 215 with the logic of inventory management system 205. Exemplary embodiments of the structure of such data and tables are provided below. Examples of software for implementing stock module 215 include the Stock Engine or Line Inventory Management Engine (LIME) for an SCM system, available from SAP AG (Walldorf, Germany).

As will be appreciated by those skilled in the art, the inventory management system 205 may be an integrated solution and, in such cases, a separate stock engine (such as stock engine or module 215) may not be necessary. Thus, consistent with embodiments of the invention, stock data may be integrated and stored in database 210 of inventory management system 205. Further, although not shown in FIG. 2, standard I/O interfaces and communication means may be provided to facilitate the entry, output and communication of data with inventory management system 205, including the communication of system 205 with other components or modules (such as stock module 215). Thus, for example, conventional keyboard(s) and display screen(s) may be provided to permit warehouse operators and workers to view and/or enter data. Further, terminals and other components may be networked with inventory management system 205 to permit the entry or viewing of data from any location within the warehouse. Such networked arrangements may be implemented through wired or wireless networks (e.g., intranets, WANs, LANs, Wi-Fi, RF and other wireless networks, etc.).

The components illustrated in FIG. 2 may be physically located at warehouse 100 or located remotely from the warehouse at, for example, a head office or management facility. Therefore, the location of inventory management system 205 and other components are not critical for implementing systems and methods consistent with the present invention.

Figure 3:
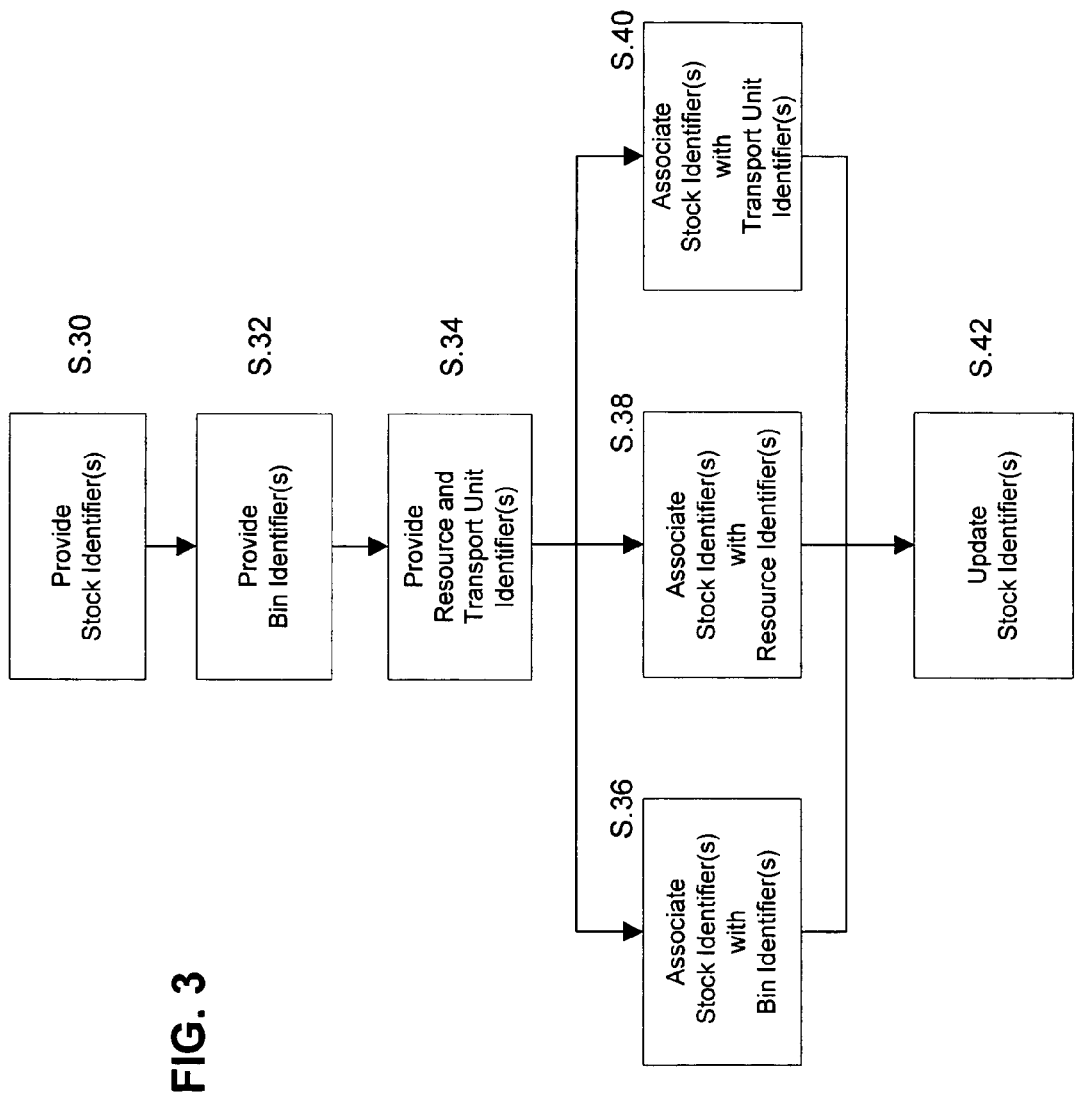
FIG. 3 is a flowchart of an exemplary method for managing stock, consistent with an embodiment of the present invention.

FIG. 3 is a flowchart of an exemplary method for managing stock, consistent with an embodiment of the present invention. The exemplary method of FIG. 3 may be implemented to provide visibility as to the location of stock at all times, including during its placement in a warehouse yard or during its transport from one location to another location.

As shown in FIG. 3, stock identifier(s) may be provided to identify stock (step S.30). Consistent with the present invention, a stock identifier may comprise a data structure or record that provides information to identify any element or quantity of stock. A stock identifier may be created when stock is checked-in or delivered to the warehouse. The stock identifier may be stored in a database and managed by a computerized inventory system. For example, with reference to the exemplary embodiment of FIG. 2, stock identifiers may be created and managed by inventory management system 205, either alone or in combination with stock module 215. In one embodiment, stock identifiers or records are created and managed by inventory management system 205, with some or a particular set of the stock data being indexed and stored in stock module 215.

Each stock identifier may comprise various types or categories of data for identifying the stock. Such data may be organized into tables or any other suitable data structure. By way of example, a stock identifier may include data indicating the name or owner of the stock and the basic characteristics of the stock (e.g., weight, volume, dimensions, shelf life or expiration date, etc.). Additionally, or alternatively, the stock identifier data may include a stock number, an inspection or warehouse log number, a goods received date and/or stock status data (e.g., free, blocked, etc.).

In addition to providing the stock identifier(s), bin identifier(s) may be provided to identify the bin(s) in the warehouse (step S.32). Consistent with the present invention, a bin identifier may comprise a data structure or record that provides information to identify a bin for storing an element or quantity of stock. A bin identifier may be created for each bin in the warehouse. Further, similar to the stock identifier(s), the bin identifier(s) may be stored in a database and managed by a computerized inventory system. For example, with reference to FIG. 2, bin identifiers may be created and managed by inventory management system 205.

As will be appreciated by those skilled in the art, the present invention is not limited to the use of bin identifier(s). In addition or as an alternative to bin identifier(s), identifiers may be provided for other storage elements (such as containers, buckets, barrels and the like). For the ease of reference, however, aspects of the invention will be described hereinafter with reference to bins and bins identifiers. Thus, the term "bin" should be considered to cover any type of storage element.

Consistent with the present invention, each bin identifier may comprise various types or categories of data for identifying the bin. Such data may be organized into tables or any other suitable data structure. By way of example, a bin identifier may include data indicating the location of the bin (e.g., storage lane and/or row) and the basic characteristics of the bin (e.g., dimensions, weight restrictions, resource or access restrictions, etc.). Additionally, or alternatively, the bin identifier data may include a bin number, bin type (refrigerated, non-refrigerated, etc.) and/or bin status data (e.g., occupied, vacant, etc.).

Referring again to FIG. 3, resource and transport unit identifier(s) may also be provided to identify resources for moving or handling stock in the warehouse and any unit or capacity of a vehicle for transporting stock outside of the warehouse (step S.34). Transport unit identifier(s) may be associated with stock identifier(s) that have been grouped together into a particular transport unit. A transport unit may include one or more pieces of stock identified by one or more stock identifiers. In addition, because stock identifiers are capable of being associated with bin identifier(s), it is possible to determine the bins from which any stock grouped together into a particular transport unit originated. Further, transport unit identifier(s) may be grouped together and associated with a vehicle, which may, for example, deliver certain transport units to a first location and other transport units to a second location. Through the use of transport unit identifier(s), the location of each transport unit, and ultimately, each piece of stock being transported on a vehicle may be tracked.

Consistent with the present invention, resource and transport unit identifiers may comprise data structures or records that provide information to identify resources for moving or handling any element or quantity of stock and transport units for stock being moved or transported outside of a warehouse. Resource identifiers may be created for resources in the warehouse, whereas transport unit identifiers may be created for transport units of vehicles for moving or transporting stock outside of the warehouse. Resource and transport unit identifiers may be stored in a database and managed by a computerized inventory system. For example, with reference again to the exemplary embodiment of FIG. 2, resource identifiers may be created and managed by inventory management system 205.

As used herein, the term "resource" refers to any equipment, device or entity for moving, transporting or otherwise handling stock in the warehouse. Resources may include, for example, light and heavy capacity forklifts operated by human operators, automatically controlled forklifts, conveyors, trolleys, pushcarts, as well as warehouse workers or other human operators for manually moving or transporting stock. Further, the term "transport unit" as used herein refers to any unit or capacity of equipment, a device or a vehicle for moving and transporting stock to and from the warehouse. Transport units may be defined for various vehicles including, for example, motorcycles, cars, vans, trucks, tractor-trailers, trains, freight carriers, planes, boats, ships, as well as cargo boxes and shipping containers. As will be appreciated by those skilled in the art, the above-identified resources and transport units are merely examples and any type of resource or transport unit may be used in combination with the teachings of the present invention.

As with the stock and bin identifiers, each resource or transport unit identifier may comprise various types or categories of data. Such data may uniquely identify a resource or transport unit and may be organized into tables or any other suitable data structure. By way of example, a resource identifier may include data indicating a resource ID or number, a resource name, a resource type, a user name (e.g., name or employee number of human operator) and operating data indicating the basic characteristics of the resource (e.g., maximum weight restrictions, actual weight on the resource, etc.). Similarly, the transport unit identifier data may include a transport ID or number, a transport unit name, a transport unit type, a user name and operating data indicating the basic characteristics of the transport unit. Additionally, or alternatively, the resource and transport unit identifier data may include status data (e.g., active, inactive, etc.).

Consistent with the present invention, stock identifier(s) are associated or assigned to other identifier(s) according to their location (steps S.36-S.40). For example, stock identifier(s) may be associated with corresponding bin identifier(s) (step S.36) or corresponding resource identifier(s) (step S.38). In the former case, stock identifier(s) that identify stock that are stored in bins are associated with bin identifier(s) that identify the corresponding bins in which the stock is stored. In the later case, stock identifier(s) that identify stock that are being transported or otherwise handled by resources are associated with resource identifier(s) that identify the corresponding resources that are moving or handling the stock in the warehouse. If the stock is being transported outside of the warehouse, then the stock identifier(s) may be associated with corresponding transport unit identifier(s) (step S.40). As a result, each stock identifier is associated with a bin identifier, a resource identifier or a transport unit identifier depending on its location. Thus, regardless of the status of the stock, an examination of the stock identifier will always provide visibility as to the location of the stock (i.e., stored in a bin or in transport with a resource or transport unit).

During warehouse operations, updates to the stock identifier(s) may be made, as required or needed (step, S.42). For example, assume that a stock identifier for a stock element is associated with a resource identifier that identifies a resource transporting the stock element. When that stock element is transferred by the resource and stored at a new bin, the registration of stock with the bin may be made with the inventory management system (such as inventory management system 205). In response, the inventory management system may reassign the stock identifier for the stock so that it is associated with the bin identifier for the new bin where the stock is stored. Thus, an update can be made to reassign the stock identifier from the resource identifier to the appropriate bin identifier.

As a further example, assume that stock needs to be moved into the warehouse from a transport vehicle checked-in or parked in the warehouse yard. When the transport unit is moved to the loading/unloading area, the required stock may be loaded onto a resource (such as a forklift). Reporting the transfer of stock to the resource may trigger the inventory management system to update and reassign the stock identifier for the stock from the transport unit identifier to the resource identifier. Thereafter, when the stock has been moved to a bin location in the warehouse, a further report of the transfer of the stock may cause the inventory management system to reassign the stock identifier; in this case, a reassignment of the stock identifier from the resource identified to the bin identifier.

The inventory management system can also make updates when stock is removed from a bin location, a resource, or a transport unit. By way of example, assume there is a transfer order to move stock from a first bin to a second bin. When a warehouse worker removes the stock from the first bin with a resource (such as forklift), the registration of the pick-up may be made with the inventory management system. At this point, an update to the database will be made to associate the stock identifier for the stock with the resource identifier for the resource transporting the stock. When the stock is relocated to the second bin and registered with the inventory management system, another update may be made so that the stock identifier is associated with a bin identifier for the second bin.

Registrations of the location of stock (e.g., in a bin or with a resource or transport unit) may be implemented in various ways. For example, in one embodiment, bar codes and/or RFIDs are used to label and identify stock, bins and/or resources or transport units. During a pick-up or drop of stock, these bar codes and/or RFIDs may be scanned or read with a scanner operated by a warehouse worker and the collected data communicated (e.g., using a wireless link, a wired network, etc.) back to the inventory management system to register the location of the stock and trigger an update to the database. Alternatively, or additionally, a warehouse operator may radio or call-in the updates to a central office where a human operator manually enters the updates into the inventory management system. Stock arriving and departing from a warehouse may also be scanned so that it is associated with a transport unit, a resource, or a bin location.

To associate a stock identifier with a bin identifier, a resource identifier, or a transport unit identifier various techniques may be employed. By way of example, in a database maintained by inventory management system, a table may be provided to associate each stock identifier with a bin identifier, a resource identifier, or a transport unit identifier. In another embodiment, a relational database is maintained, wherein stock identifier(s) are stored and associated with bin, resource, or transport unit identifier(s). In still another embodiment, each stock identifier may include a pointer or link that associates it with a bin identifier, a resource identifier, or a transport unit identifier. As will be appreciated, the above-identified approaches are merely examples and other database techniques and approaches may be utilized to associate identifiers, consistent with the present invention.

To further illustrate systems and methods consistent with the present invention, reference will now be made to the exemplary embodiment of FIG. 4. In FIG. 4, an exemplary environment is shown including warehouse 410 and warehouse 420. As illustrated in FIG. 4, vehicle 430 is located outside of warehouse 410 and vehicle 432 is located outside of warehouse 420. When stock is loaded onto vehicle 430, a bar code scan or RFID sweep may occur to register the loading of the stock with the inventory management system. The bar code scan or RFID sweep may involve a warehouse worker scanning or reading a bar code or RFID label on the shipping or transfer order for the stock, a shipping bundle or pallet for the stock, on the stock itself, and/or on a resource operated by the warehouse worker that is handling the stock. As disclosed herein, a resource may comprise any type of resource for moving or otherwise handling stock in the warehouse. Examples of resources include, for example, light and heavy capacity forklifts, conveyors, trolleys, pushcarts, as well as human operators for manually moving stock.

For the purposes of the following example, assume that a warehouse worker receives a transfer order requesting that certain stock be transported from warehouse 410 to warehouse 420. As shown in FIG. 4, stock is loaded onto vehicle 430 at warehouse 410. At the time the stock is picked-up by vehicle 430, an inventory management system or module (such as that shown in FIG. 2) may be updated to reflect that the stock is now located on vehicle 430. This may be achieved by associating the stock identifier(s) for the loaded stock to the transport unit identifier(s) for vehicle 430. Thereafter, a second warehouse worker may desire to locate some of the stock removed from warehouse 410. This may be due to a more urgent transfer order or a decision by warehouse management to redirect the stock. By checking the inventory management system, the second warehouse worker can determine that the stock removed has been placed on vehicle 430. Accordingly, the second warehouse worker is able to learn that vehicle 430 is being used to move the stock and that it is no longer located in warehouse 410.

As a result, the second warehouse worker may contact a worker driving vehicle 430 (e.g., by radio, mobile phone or pager) to reroute certain desired stock while it is in transport. Once the first warehouse worker is contacted, he/she may be informed to transport all or a certain quantity of the stock on vehicle 430 to warehouse 420. At warehouse 420, vehicle 430 will drop-off the requested stock and register the same with the inventory management system. This may trigger an update to the appropriate stock identifier(s) so that they become associated with bin or resource identifier(s) for warehouse 420. In addition, certain stock may be unloaded from vehicle 430 at warehouse 420 and loaded onto vehicle 432. Upon unloading the stock from vehicle 430 to vehicle 432, a bar code or RFID sweep may occur to send an update the inventory management system and reassign the appropriate stock identifier(s) to transport unit identifier(s) for vehicle 432. Vehicle 430 then may proceed to another location, such as a warehouse, storage facility, or the like (not shown).

As disclosed herein, systems and methods consistent with the present invention provide stock visibility to allow warehouse workers to locate stock, even when it is in transport. Embodiments of the invention also enable warehouse managers and other workers to request that stock destined for a particular location be rerouted to a new location. Such visibility and control is advantageous because during a typical warehouse day, there may be numerous changes in transfer orders or updates to stock deliveries.

In order to further illustrate embodiments consistent with the present invention, reference will now be made to FIGS. 5A and 5B. FIGS. 5A and 5B illustrate hierarchal overviews of exemplary data objects for providing stock visibility, consistent with the principles of the present invention.

As shown in FIG. 5A, it is possible to associate stock-A with bin-A. Upon conducting a bar code or RFID sweep, for example, a stock identifier 515 for stock-A may be associated with a bin identifier 505 for bin-A. The association of stock-A may result in the updating of a location data table for describing bin-A. The location data table may be updated as a result of the bar code or RFID sweep to indicate that a record describing stock-A indicates it is located in bin-A. Additionally, a stock data table describing stock in the warehouse may also be updated to indicate that stock-A is located in bin-A. Exemplary data tables for describing stock and bin-locations are described above and further examples are provided below.

As shown in FIG. 5B, stock-A may be associated with a resource-A while it is located in a particular warehouse. Once a warehouse worker retrieves stock-A from a bin, after a bar code or RFID sweep, the stock identifier 515 for stock-A may be updated and associated with a resource identifier 520 for resource-A. As indicated above, a stock data table may include a record entry for a stock identifier that describes stock-A. Resource identifier 520 is also a record stored in the warehouse management system that describes a resource (in this case resource-A).

Figure 5C:
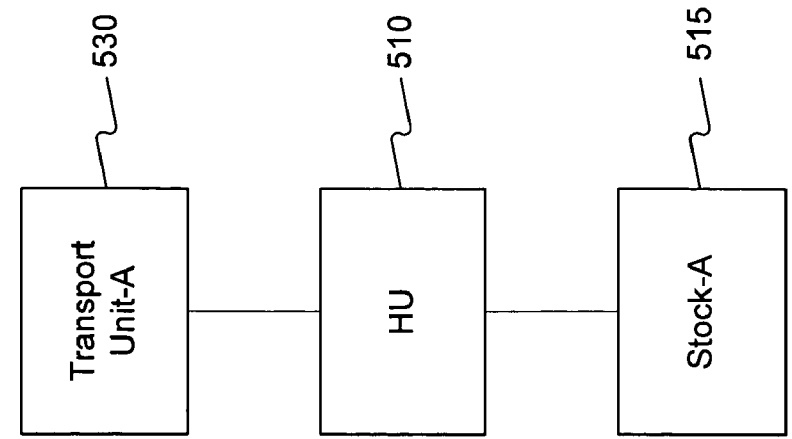
FIGS. 5A, 5B, and 5C illustrate hierarchal overviews of exemplary data objects, consistent with embodiments of the present invention.
Figure 5B:
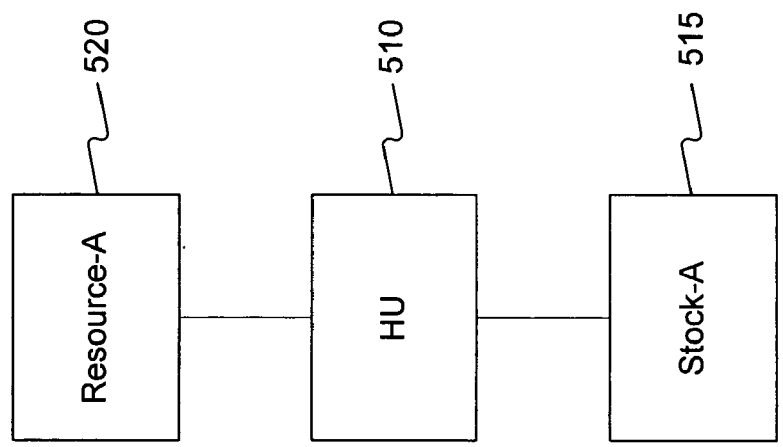
Figure 5A:
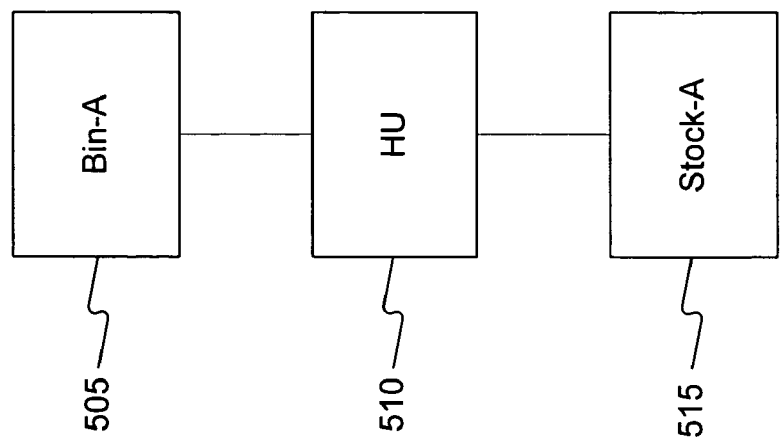

As shown in FIG. 5C, it is also possible to associate stock-A with transport unit-A. Upon conducting a bar code or RFID sweep, for example, a stock identifier 515 for stock-A may be associated with a transport identifier 530 for transport unit-A. The association of stock-A may result in the updating of a location data table for describing transport unit-A. The location data table may be updated as a result of the bar code or RFID sweep to indicate that a record describing stock-A indicates it is located on transport unit-A. Additionally, a stock data table describing stock in the warehouse may also be updated to indicate that stock-A is located with transport unit-A.

As shown in FIGS. 5A, 5B, and 5C, the stock, bin, resource, and transport unit identifiers may be associated or arranged hierarchically. In such a case, the parent or root node of each hierarchy may be a bin, resource or transport unit identifier, with a stock identifier being the child node of a bin, resource or transport unit identifier. Optionally, each stock identifier may also be associated with an identifier 510 for a handling unit (or HU). The term "handling unit" refers to any grouping or bundling of more than one stock element. For example, when stock arrives at a warehouse, the stock may be packaged together in a pallet or other shipping bundle, which constitutes a handling unit. After arriving at the warehouse, stock from a particular handling unit may be divided into separate stock elements, groupings or bundles. Accordingly, it may be desirable to be able to determine the handling unit that once included a particular stock element, group or bundle. An identifier or record describing a handling unit may include data stored in a table or other data structure in a database of the warehouse management system. By way of example, the data of a handling unit identifier may include data defining a unique ID for the handling unit and the name or owner of the handling unit.

As shown in FIGS. 5A, 5B, and 5C, if handling unit identifiers are provided, they may be hierarchically arranged between the stock identifiers and the bin, resource and transport unit identifiers. Further, although not shown in the drawings, each handling unit identifier may have more than one stock identifier associated with it in a hierarchy and, furthermore, each bin, resource or transport unit identifier may have one or more handling units or stock identifiers associated with it in a hierarchy.

For example, in the exemplary embodiment of FIG. 5B, resource identifier 520 is associated with handling unit identifier 510, which is associated with stock identifier 515. For example, stock-A may be a stock element that arrived to the warehouse as part of the handling unit identified by identifier 520. As indicated above, the inclusion of handling unit identifier(s) is optional and the invention may be practiced without using handling units. If handling units are not used, handling unit identifier 520 may include no data, and may simply be a null placeholder. Optionally, handling unit identifiers may be eliminated entirely.

As shown in FIG. 5A, handling unit identifier 510 is the parent of stock identifier 515, and handling unit identifier 510 is associated with bin identifier 505, which is the root node in the hierarchy. When stock-A is moved from bin location-A in accordance with the requirements of a transfer order, a bar code or RFID sweep may occur to identify the stock as being located with a resource. If the stock is being moved within the warehouse, the handling unit identifier 510 and stock identifier 515 may first be assigned to a resource identifier for the resource before being reassigned to another bin identifier associated with the final bin destination (e.g., bin location-B).

When a worker receives a transfer order requesting movement of stock-A to a new location, such as another warehouse, another bar code or RFID sweep may occur. Consistent with the present invention, based on the bar code or RFID sweep, an update may be made by the inventory management system to reassign the handling unit and stock identifiers to a transport unit identifier for the transport vehicle (e.g., transport unit-A). This will cause transport unit-A to be associated with stock-A. Once stock-A arrives at its new location, another bar code or RFID sweep may occur, which associates stock-A with a resource or bin location of the new location, for example.

FIGS. 6-15 illustrate exemplary database tables for providing records and index tables to identify stock, stock locations, handling units, and transport units. Consistent with the present invention, the features of FIGS. 6-15 may be implemented in various inventory management systems and environments, such as the exemplary embodiment of FIG. 2.

FIG. 6 illustrates an exemplary table used to define resources, consistent with an embodiment of the present invention. Resource table 605 may be used by a warehouse or inventory management system (such as inventory management system 205) as a resource identifier or record for identifying different resources.

As shown in FIG. 6, resource table 605 may include data fields for providing various types or categories of data, such as a Global Unique ID (GUID), Resource Type, User Name, and Status for a particular resource. The GUID may be any numeric or alphanumeric ID that is unique to identify a particular resource. The Resource Type field in table 605 may specify the type of resource, such as whether the resource is a light or heavy capacity forklift operated by a human operator, an automatically controlled forklift, conveyor, trolley, pushcart, or human, for example. The User Name field in table 605 may specify the user name or ID of the operator of a particular resource. The Status field may indicate the status of the resource, such as whether a resource is, for example, active or inactive.

Additionally, in embodiments consistent with the present invention, resource table 605 may include additional fields describing each resource. For example, resource table 605 may include: a client name associated with a resource; warehouse ID comprising a numeric or alphanumeric ID or code for specifying a particular warehouse in which a resource is located; a resource name or code to indicate, for example, whether the resource is equipment controlled by a human operator (e.g., resource name="Device") or a human operator alone (e.g., resource name="User"); a capacity check method code or data for specifying how the capacity of a resource is checked (such as by weight or volume); data indicating the maximum weight capacity of a resource; data indicating the unit of weight; data indicating the actual or loading weight on a resource; data indicating a maximum volume; data indicating a unit of volume; and/or data indicating an actual volume.

Figure 7:
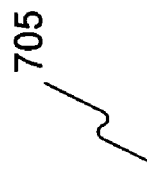
FIG. 7 is an exemplary stock table used to define stock, consistent with an embodiment of the present invention.

FIG. 7 illustrates an exemplary stock table 705 used to define stock, consistent with an embodiment of the present invention. Stock table 705 may be used by a warehouse or inventory management system (such as inventory management module 205) as a stock identifier or record to identify stock in the warehouse. As shown in FIG. 7, stock table 705 may include a number of different data fields or categories for identifying stock in the warehouse, including the quantity of that stock in the warehouse. For example, table 705 may include a field for a GUID for stock included in the database. The GUID assigned to each stock may be used as an index for identifying particular stock data concerning the stock. Such stock data may be stored in separate database or set of tables. For example, in one embodiment, warehouse management module 205 may use the GUID to locate stock data that is managed and stored by stock module 215. In such a case, the GUID may act as an index to a stock index table (see, e.g., FIG. 8) and/or other tables with particular stock data concerning the stock.

As further shown in FIG. 7, stock table 705 may also include other data, such as: a Parent field indicating the parent node of the stock in a hierarchy (such as a stock's handling unit, if appropriate, and/or a bin or resource); a Unit field for indicating a unit of measure for the stock quantity (such as pieces (PC), a box, etc.); and/or a Quantity field indicating the quantity of stock. A Node field may also be included that contains data defining an ID or name of the node of the stock in a hierarchy. Other stock data may be included in stock table 705 and/or other tables. Therefore, the above-identified items should be considered as examples and not limiting to the scope of the invention.

As disclosed herein, the records or identifiers of stock, handling units (if applicable), resources and bins in the warehouse may be stored in a hierarchy. The position of each stock identifier in a hierarchy may be indicated through data indicating, for example, the parent and/or other node(s) related to that stock identifier. In the exemplary embodiment of FIG. 7, the Parent field is provided for data indicating an index or ID of the parent node. In one embodiment, inventory management system 205 may use the Parent data as an index to a database table identifying the handling unit, bin location or resource identifier that serves as a parent node. For example, assume the parent of a stock is a handling unit (such as H1 or H2). In such a case, the index or GUID for the handling unit (e.g., H1 or H2) may be used as a lookup to one or more tables (such as a handling unit (HU) index table, etc.) to locate further data related to the handling unit. An exemplary embodiment of a HU index table is provided below with reference to FIG. 9.

FIG. 8 illustrates an exemplary stock index table 805, consistent with an embodiment of the present invention. Stock index table 805 may be created and stored by inventory management system 205 or stock module 215. By way of example, in one embodiment, stock index table 805 is stored and managed by stock module 215 and accessible to inventory management system 205.

As shown in FIG. 8, stock index table 805 may include a number of different data fields, such as the GUID for each stock included in the database. As stated above, the GUID may be an index that is stored by a stock table (such as stock table 705 in FIG. 7) and used by warehouse management module 205 for looking-up the appropriate data from a stock index table 805. The data fields in stock index table 805 for each stock may include, for example, a Material Number field comprising data defining the material number or ID for the stock; a Batch field comprising data defining the batch number assigned or associated with the stock; a Category field comprising data defining a stock category (e.g., free, blocked, received, etc.) for the stock; and/or an Owner field comprising data defining the owner of the stock (e.g., a customer, a company, a supplier, etc.).

FIG. 9 illustrates an exemplary HU index table, consistent with an embodiment of the present invention. HU index table may be created and stored by inventory management system 205. As indicated above, an HU index table may provide information concerning a handling unit, with each handling unit being indexed by a GUID. The GUID for a handling unit may be stored or referenced in other tables, such as a stock table (see, e.g., FIG. 7).

As shown in FIG. 9, HU index table 905 may include a number of different data fields, including a GUID field comprising data defining a GUID or code for each handling unit. HU index table 905 may also include further information about each handling unit, such as handling unit identifier. The handling unit identifier may be an alphanumeric identifier specifying a particular handling unit. The handling unit identifier may correspond to a code or bar code placed on the actual handling unit. As indicated, the use of handling units is optional and therefore, in an embodiment wherein handling units are not used, HU index table 905 may contain null placeholders, or alternatively, HU index table 905 may be omitted from the implementation.

FIG. 10 illustrates an exemplary location index table 1005, consistent with an embodiment of the present invention. Location index table 1005 may be created and stored by inventory management system 205. Table 1005 may serve as an identifier or record for identifying bins and/or other storage locations.

As shown in FIG. 10, location index table 1005 may include a number of different data fields, such as a GUID for each bin location. The GUID may serve as an index to table 1005 for gathering further information concerning a bin location. For this purpose, location index table 1005 may include other data fields such as: a Warehouse Number field comprising data defining the number or code of a warehouse in which the bin is located; a Storage Type field comprising data indicating the type of storage area of the bin holding the stock, such as a reserve area, a staging pick-up area, a high rack bay, a goods received area, etc.; and a Location Number field comprising data defining a location number or code assigned to the bin.

FIG. 10 is an exemplary embodiment of a location table for bins and other storage locations. Other data may be included in location table 1005 and/or other tables. Therefore, the above-identified items should be considered as examples and not limiting to the scope of the invention.

FIG. 11 illustrates an exemplary location and hierarchy table 1105, consistent with an embodiment of the present invention. Location and hierarchy table 1105 may be created and stored by a warehouse or inventory management system (such as inventory management system 205) and provide location and hierarchy data.

As shown in FIG. 11, location and hierarchy table 1105 may include a number of different data fields, such as an ID field comprising data defining an ID or code for each item included in the database (such as stock, a handling unit, a location or a resource). In one embodiment, the ID may correspond to a GUID for each item and be used as an index for other tables, such as a resource table, a stock table, a bin location table, a HU table, a vehicle table, a TU table, etc. (see, e.g., FIGS. 6-15).

Location and hierarchy table 1105 may also provide further information for each item. For example, location and hierarchy table 1105 may also include: an Index field comprising data to describe the index of each item in the table relative to, for example, a hierarchy; a Type field comprising data to describe the type of the item in the table (e.g., stock="S"; handling unit="HU"; bin location="L"; resource="R"); a Parent field comprising data to indicate the parent node of the item in a hierarchy (which may be set to a "Root" value if no parent node exists); a Parent Index field comprising data to indicate an index of the parent node relative to a hierarchy; a Parent Type field comprising data to indicate the type of the parent node (e.g., handling unit="HU"; bin location="L"; resource="R", etc.); a Level field comprising data to indicate the level or relationship between the parent node and the item in a hierarchy (such as "1" for one level from the item in the hierarchy; "2" for second level from the item of the hierarchy, etc.); and a Node field to identify the group or node of which a particular item belongs.

In the example of FIG. 11, data is shown from four different items arranged in a hierarchy: stock S1, stock S2, handling unit H1; and location L2 (which could comprise, for example, a bin location or other storage location). Stock S1 is at the third level or bottom of the hierarchy. The parent nodes associated with stock S1 include handling unit H1 and location L2. Handling unit H1 is one level above stock S1 and location L2 is two levels above stock S1. Further, based on the exemplary data of FIG. 11, stock S2 is also at the bottom of the hierarchy and its parent nodes include handling unit H1 (one level above) and location L2 (two levels above). Moreover, handling unit H1 is located one level below location L2, which is at the root or top level of the hierarchy. Therefore, according to the example of FIG. 11, stock items S1 and S2 are associated with location L2. Should stock item S1 or S2 be moved or transferred from location L2, then the database may be updated to associate S1 or S2 with the particular resource (R1, R2, R3, etc.) that is being used for transport.

When stock is being transported between warehouses or other locations, additional data tables may be used to store information describing the transport units and the location of the stock. Exemplary embodiments of the structure of such data and tables are provided below with reference to, for example, FIGS. 12-15. The exemplary tables of FIGS. 12-15 may be created and stored by a transportation or inventory management system (such as inventory management system 205).

Figure 12:
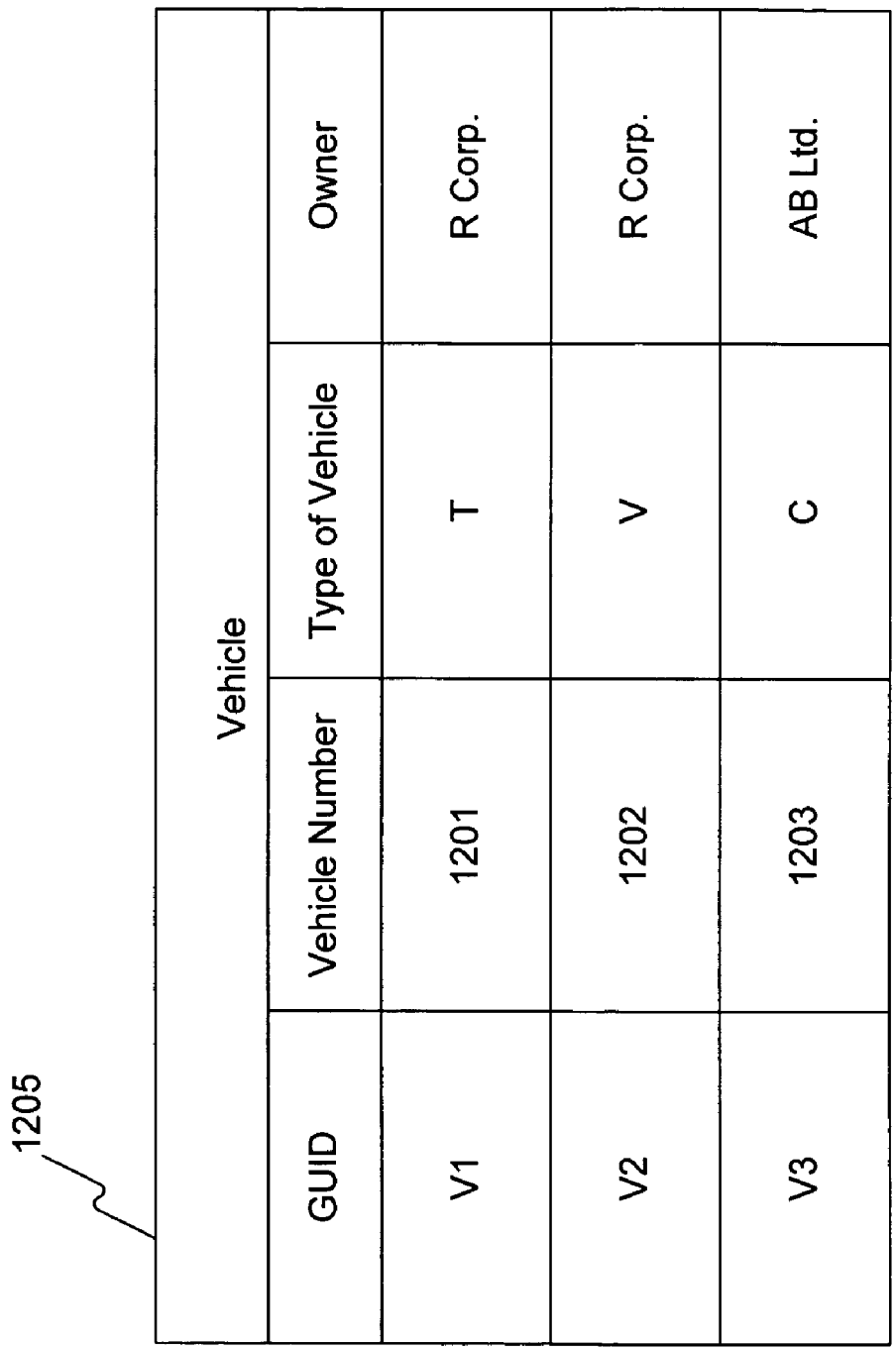
FIG. 12 illustrates an exemplary vehicle table, consistent with an embodiment of the present invention.

FIG. 12 illustrates an exemplary table used to define vehicles and other types of transporting equipment or devices. Vehicle tables may be used to define a particular vehicle used for moving transport units. Vehicles may include any means for transporting stock, such as trucks, vans, other motored vehicles, and other forms of transit, such as trains and airplanes. One of skill in the art will recognize that any form of transportation is in keeping with the spirit and scope of the present invention.

Consistent with embodiments of the invention, each vehicle may include one or more transport units. A transport unit may correspond to a grouping of stock items that are being transported to a given location. A vehicle may include, for example, one transport unit destined for a first location, and another transport unit destined for a second location. Examples of such arrangements are described in more detail in relation to FIG. 13.

As shown in FIG. 12, vehicle table 1205 may include data fields for providing various types or categories of data describing a particular vehicle. For example, vehicle table 1205 includes data fields for a vehicle Global Unique ID (GUID), vehicle number, type of the vehicle, and owner of the vehicle. In addition, other details could also be added to vehicle table 1205, such as the driver's name, the co-driver's name, if there is one, language of the driver, license plate or ID of the vehicle, business partner number of the transportation service provider, and/or an object number of the status management. One or more of these parameters may be used as an index for identifying vehicle information. For example, in one embodiment, the vehicle GUID is used as index to search and locate vehicle information associated with transport units (cf. FIGS. 13 and 14).

FIG. 13 illustrates an exemplary table of transport unit identifiers used to define transport units, consistent with an embodiment of the invention. As shown in FIG. 13, transport unit (TU) table 1305 may include data fields for providing various types or categories of data describing each transport unit. For example, transport unit table 1305 includes a transport unit Global Unique ID (GUID), a transport unit number, a client name to indicate, for example, the client to which the transport unit is being delivered, and the location of the transport unit. By way of example, the location data for a transport unit identifier may identify the location or assignment of the transport unit by vehicle GUID (e.g., V1, V2, V3, etc.). For purposes of illustration, FIG. 13 illustrates one transport unit (transport unit number 1301) that is located or assigned to vehicle V1 and two transport units (transport unit numbers 1302 and 1303) that are located on vehicle V2 (cf. FIG. 12).

Other embodiments consistent with the invention are also possible. For instance, in one embodiment, when a transport unit is assigned, the assignment is stored with a timeslot. By way example, a transport unit (TU1, TU2, TU3, etc.) may be assigned from 20040101000000 to 20041231235959 to a vehicle (V1, V2, V3, etc.). A similar approach may be used for the assignment of transport units to other entities or locations (e.g., for the assignment of a transport unit to a door or staging area of a warehouse). Therefore, assignment tables may be provided which record assignments of the transport units according to time (see, e.g., FIG. 15).

Consistent with embodiments of the invention, transport unit identifiers may be created when stock is grouped together for transport. Alternatively, or additionally, one or more transport unit identifiers may be created for the transport units assigned to or located on each vehicle. Stock identifiers may be assigned to transport unit identifiers by reference to, for example, transport unit GUIDs (TU1, TU2, etc.), transport unit numbers (1301, 1302, etc.) and/or other transport unit information. In addition, at the time that a stock identifier is created, it is assigned a GUID.

Consistent with embodiments of the invention, other information may be included in transport unit table 1305, such as the handling unit that is representing the transport unit and the departure date and time of the transport unit. In addition, transport unit table 1305 may also include a data field for identifying each GUID of each piece of stock being grouped together into a particular transport unit. A particular transport unit is assigned to a particular vehicle during transport. However, a particular vehicle may include more than one transport unit. Further, each transport unit on a vehicle may have a different destination than other transport units on the same vehicle.

When transport units are moved onto a vehicle, and RFID scan may take place. A worker may scan an RFID located on the transport unit itself and a bar code or RFID located on the vehicle when picking up the stock. Once the worker has scanned these items, the information is transmitted and a database in the computerized inventory system is updated to indicate that the particular stock is no longer located in the bin. Similarly, when transport units are unloaded from a vehicle, a worker may scan and RFID located on the transport unit and a bar code or RFID located at the new location. Alternatively, if the delivery location does not have a bar code or RFID, the worker may simply scan the transport unit to indicate that the transport unit has been delivered at its intended destination. Further, at the time that a particular transport unit is loaded onto a particular vehicle and scanned, a time stamp field (not shown) may be updated in an appropriate table to indicate the time that the transport unit was loaded. In a similar fashion, when a particular transport unit is unloaded from a vehicle and scanned, a timestamp field indicating the time that the assignment of the transport unit to the vehicle has ended may be updated.

Figure 14:
FIG. 14 illustrates an exemplary transport unit tracking table, consistent with an embodiment of the present invention.

FIG. 14 illustrates an exemplary table, consistent with an embodiment of the invention, that may be used for tracking transport units by identifying the warehouses from which transport units originated. As shown in FIG. 14, transport unit and warehouse table 1405 may include data fields for providing various types or categories of data, such as client name, transport unit number, and destination warehouse number, and the location of the transport unit. When tracking the location of a transport unit, table 1405 may be used to determine the location by, for example, the vehicle GUID (V1, V2, etc.). Other information, such as the client name (C1, C2, etc.) and/or the destination warehouse (W3, W2, etc.) may be used to determine the location or status of the transport unit, such as whether transport unit has been delivered to a predetermined client or destination.

FIG. 15 illustrates another exemplary table, consistent with an embodiment of the invention. The exemplary table of FIG. 15 may be used for tracking transport units by identifying the time of assignment of transport units to vehicles or other entities or locations (such as a door or staging area of a warehouse). As shown in FIG. 15, assignment to vehicle table 1505 may include data fields for providing various types or categories of data, such as client name, transport unit number, a start time stamp for the start of an assignment, an end time stamp for the end of an assignment, and the vehicle number where the transport unit is located. The exemplary table of FIG. 15 may be modified to provide other information or types of assignments by, for example, substituting or adding data fields.

Accordingly, as disclosed, systems and methods are provided for managing stock and for providing stock visibility. In one embodiment, an inventory management system may be implemented using a computerized module and a database including data tables. Data records may be defined in the tables describing the location of stock, the stock itself, resources, transport units and optionally, handling units. Upon the removal of stock from a bin, the inventory management system may be updated to indicate the resource being used to move the stock and, thus, provide visibility of the stock while it is being moved in the warehouse. In addition, by being able to identify transport unit(s) and the location of stock while it is being transported outside of the warehouse, warehouse workers can then contact the operator of the transport unit and/or request that certain stock be rerouted. As a result, it is therefore possible to more efficiently manage warehouse and transportation operations.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed:

1. A computer-executable method for managing stock in transport, the method comprising:
   providing a stock identifier to identify the stock;
   providing a transport unit identifier to identify a transport unit of a vehicle, wherein the transport unit represents a collection of stock for vehicle transport, and further wherein the vehicle includes at least two transport units with different transport unit identifiers, and wherein the stock identifier and transport unit identifier are provided in at least one memory device;

creating, by a processor, an initial association in a database between the stock identifier and the transport unit identifier at a time at which the stock is physically moved on to the vehicle which transports the stock offsite;

determining, from the database, the initial association between the transport unit identifier and the stock identifier, indicating that the stock identifier is located with the vehicle;

redirecting the vehicle, upon the determining, to transport the stock to an alternate location;

registering the stock at the alternate location upon completion of the redirected transport by the vehicle; and deleting the initial association between the stock identifier and the transport unit identifier upon completed transport by the vehicle.

2. The method of claim 1, further comprising:

updating the stock identifier to associate it with another transport unit identifier when the stock has been transferred to a transport unit of another vehicle.

3. The method of claim 1, wherein the alternate location is a warehouse or storage facility location.

4. The method of claim 1, further comprising registering the location of the stock with a database.

5. The method of claim 4, wherein registering comprises reading at least one of a bar code or a radio frequency identification (RFID) associated with the vehicle when loading the stock into the vehicle.

6. The method of claim 4, wherein registering comprises reading at least one of a bar code or a radio frequency identification (RFID) associated with the stock when unloading the stock from the vehicle to a warehouse.

7. The method of claim 4, further comprising triggering an update of the stock identifier when the location of the stock is registered with the database.

8. The method of claim 1, wherein the transport unit identifier specifies a location of the stock in a warehouse yard.

9. A computer-executable method for managing stock using a database, the method comprising:

issuing a transfer order to move stock from a warehouse, the stock being identified in the database with a stock identifier, wherein the database is stored in at least one memory device;

prior to execution of the transfer order, associating, by a processor, the stock identifier with a first location identifier in the database to identify the stock as being stored in a first location;

updating the database, during execution of the transfer order, to create an initial association between the stock identifier and a transport unit identifier for a transport unit of a vehicle at a time at which the stock is physically moved on to the vehicle which transports the stock offsite, wherein the transport unit represents a collection of stock for vehicle transport, and further wherein the vehicle includes at least two transport units with different transport unit identifiers;

transporting the stock, by the vehicle, to a second location in accordance with the transfer order;

determining, from the transport unit identifier, that the associated stock identifier is located with the vehicle;

redirecting the vehicle, upon the determining, to transport the stock to an alternate location;

registering the stock at the alternate location upon completion of the redirected transport by the vehicle; and updating the database, upon completed transport to the alternate location by the vehicle, to disassociate the stock identifier from the transport unit identifier.

10. The method of claim 9, further comprising:

further updating the database to associate the stock identifier with a second location identifier in the database if the stock is transferred to the second location.

11. The method of claim 10, further comprising registering the location of the stock with a database.

12. The method of claim 11, wherein registering comprises reading at least one of a bar code or a radio frequency identification (RFID) associated with the first or second location when storing the stock in the first or second location.

13. The method of claim 12, further comprising triggering the further update of the database when the location of the stock in the second location is registered with the database.

14. The method of claim 11, wherein registering comprises reading at least one of a bar code or a radio frequency identification (RFID) associated with the resource when loading the stock onto the vehicle.

15. The method of claim 14, further comprising triggering the update of the database when the location of the stock with the vehicle is registered with the database.

16. The method of claim 9, further comprising reassigning the stock identifier when the stock is registered at the alternate location.

17. A system for managing stock, the system comprising:

at least one memory device configured to store:

a plurality of records identifying stock; and a plurality of records identifying transport units, each transport unit representing a collection of stock for vehicle transport, wherein the vehicle includes at least two transport units with different transport unit identifiers; and a management module, executing on a processor, configured to:

associate a stock identifier for stock with a corresponding one of a plurality of records identifying a warehouse location where the stock is stored;

create an initial association in a database between the stock identifier and at least one transport unit identifier associated with the vehicle at a time at which the stock is removed from the warehouse location and transported with a vehicle which transports the stock offsite;

determine, from the database, the initial association between the transport unit identifier and the stock identifier, indicating that the stock identifier is located with the vehicle;

redirect the vehicle, upon the determining, to transport the stock to an alternate location;

register the stock at the alternate location upon completion of the redirected transport by the vehicle; and delete the initial association between the stock identifier and the transport unit identifier, to thereby provide visibility of the stock during its transport.

18. The system of claim 17, further comprising:

means for issuing a transfer order to transfer stock from a first location to a second location using the vehicle.

19. The system of claim 18, further comprising:

means for updating the stock identifier to associate it with a location identifier for the second location when it is transferred to the second location by the vehicle.

20. The system of claim 18, further comprising:

means for registering the location of the stock in the warehouse.

21. The system of claim 20, wherein the means for registering comprises at least one of a bar code and a radio frequency identification (RFID).

22. A system for managing the transportation of stock from a first storage facility to a second storage facility, the system comprising:

means for providing a stock identifier to identify stock stored in the first storage facility;

means for providing a transport unit identifier to identify a transport unit of a vehicle for transporting the stock, wherein the transport unit represents a collection of stock for vehicle transport, and further wherein the vehicle includes at least two transport units with different transport unit identifiers;

means for creating an initial association in a database between the stock identifier and the transport unit identifier at a time at which the stock is physically moved on to the vehicle which transports the stock offsite;

means for determining, from the database, the initial association between the transport unit identifier and the stock identifier, indicating that the stock identifier is located with the vehicle;

means for redirecting the vehicle, upon the means for determining, to transport the stock to an alternate location;

means for registering the stock at the alternate location upon completion of the redirected transport by the vehicle; and means for deleting the initial association between the stock identifier and the transport unit identifier upon completed transport to the alternate storage facility by the vehicle.

* * * * *